US011250163B2

(12) United States Patent
Hwang et al.

(10) Patent No.: US 11,250,163 B2
(45) Date of Patent: Feb. 15, 2022

(54) SERVER AND DATA MANAGEMENT METHOD

(71) Applicant: SAMSUNG ELECTRONICS CO., LTD., Suwon-si (KR)

(72) Inventors: Cheolju Hwang, Suwon-si (KR); Seongho Park, Suwon-si (KR); Taeung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/983,038

(22) Filed: Aug. 3, 2020

(65) Prior Publication Data

US 2021/0042444 A1 Feb. 11, 2021

(30) Foreign Application Priority Data

Aug. 5, 2019 (KR) .......................... 10-2019-0095100

(51) Int. Cl.
*G06F 21/62* (2013.01)
*H04L 29/08* (2006.01)
(Continued)

(52) U.S. Cl.
CPC ........ *G06F 21/6263* (2013.01); *H04L 9/0825* (2013.01); *H04L 9/3297* (2013.01); *H04L 67/22* (2013.01); *G06Q 30/0241* (2013.01)

(58) Field of Classification Search
CPC . G06F 21/6263; G06F 21/6245; H04L 67/22; H04L 9/3297; H04L 9/0825;
(Continued)

(56) References Cited

U.S. PATENT DOCUMENTS

| 10,552,494 B2 | 2/2020 | Jwa et al. | |
|---|---|---|---|
| 2011/0167003 A1* | 7/2011 | Nice | H04L 67/20 |
| | | | 705/50 |

(Continued)

FOREIGN PATENT DOCUMENTS

| EP | 2788837 | 6/2013 |
|---|---|---|
| JP | 5158662 B2 | 3/2013 |

(Continued)

OTHER PUBLICATIONS

Communication dated Oct. 30, 2020, issued by the International Searching Authority in counterpart International Application No. PCT/KR2020/010214 (PCT/ISA/210 and 237).

*Primary Examiner* — Darren B Schwartz
(74) *Attorney, Agent, or Firm* — Sughrue Mion, PLLC

(57) ABSTRACT

Provided is a data management method of a server, including receiving, from a first server, first data, in which a first identification (ID) associated with a device and a first encryption identification (ID) that encrypts an ID associated with an advertisement are mapped and second data, in which a second ID associated with the advertisement and a second encryption ID that encrypts an ID associated with the device are mapped; converting a second encryption ID associated with an electronic device, received from a second server, to the second ID based on the second data, and transmitting the converted second ID and third data to an advertisement service server; and converting a first encryption ID associated with the electronic device, received from a third server, to the first ID based on the first data, and transmitting the converted first ID and fourth data to a general service server.

16 Claims, 7 Drawing Sheets

(51) Int. Cl.
*H04L 9/32* (2006.01)
*H04L 9/08* (2006.01)
*G06Q 30/02* (2012.01)
*H04W 12/02* (2009.01)
*H04W 84/12* (2009.01)
*H04L 29/06* (2006.01)
*H04L 67/50* (2022.01)

(58) Field of Classification Search
CPC ............. H04L 63/0414; H04L 63/0428; H04L 67/306; H04L 9/0866; H04L 9/0872; H04L 67/2838; H04L 2463/121; G06Q 30/0241; G06Q 30/0255; H04W 12/02; H04W 84/12
See application file for complete search history.

(56) References Cited

U.S. PATENT DOCUMENTS

| | | | |
|---|---|---|---|
| 2012/0036352 A1* | 2/2012 | Tovar | H04L 61/2539 713/153 |
| 2012/0215612 A1 | 8/2012 | Ramer et al. | |
| 2012/0260185 A1* | 10/2012 | Choc | G06Q 30/0241 715/738 |
| 2013/0303288 A1 | 11/2013 | McCoy et al. | |
| 2014/0172556 A1 | 6/2014 | Shim et al. | |
| 2015/0149765 A1* | 5/2015 | Pauliac | H04W 12/033 713/153 |
| 2016/0048880 A1* | 2/2016 | Linden | H04L 67/42 705/14.66 |
| 2016/0259855 A1 | 9/2016 | Jwa et al. | |
| 2017/0083941 A1* | 3/2017 | Biswas | G06Q 30/0255 |
| 2017/0345050 A1 | 11/2017 | Gregory | |
| 2018/0018381 A1 | 1/2018 | Tong | |
| 2018/0068073 A1 | 3/2018 | Kaneko | |
| 2019/0236615 A1 | 8/2019 | Roetter et al. | |
| 2020/0126114 A1* | 4/2020 | Kuo | G06N 20/00 |

FOREIGN PATENT DOCUMENTS

| | | | |
|---|---|---|---|
| KR | 101246163 | B1 | 3/2013 |
| KR | 10-2014-0079615 | A | 6/2014 |
| KR | 1020140098872 | A | 8/2014 |
| KR | 10-2016-0076922 | A | 7/2016 |
| KR | 10-2016-0106289 | A | 9/2016 |
| KR | 10-2017-0022455 | A | 3/2017 |
| KR | 1020170104957 | A | 9/2017 |
| KR | 10-2018-0009821 | A | 1/2018 |

* cited by examiner

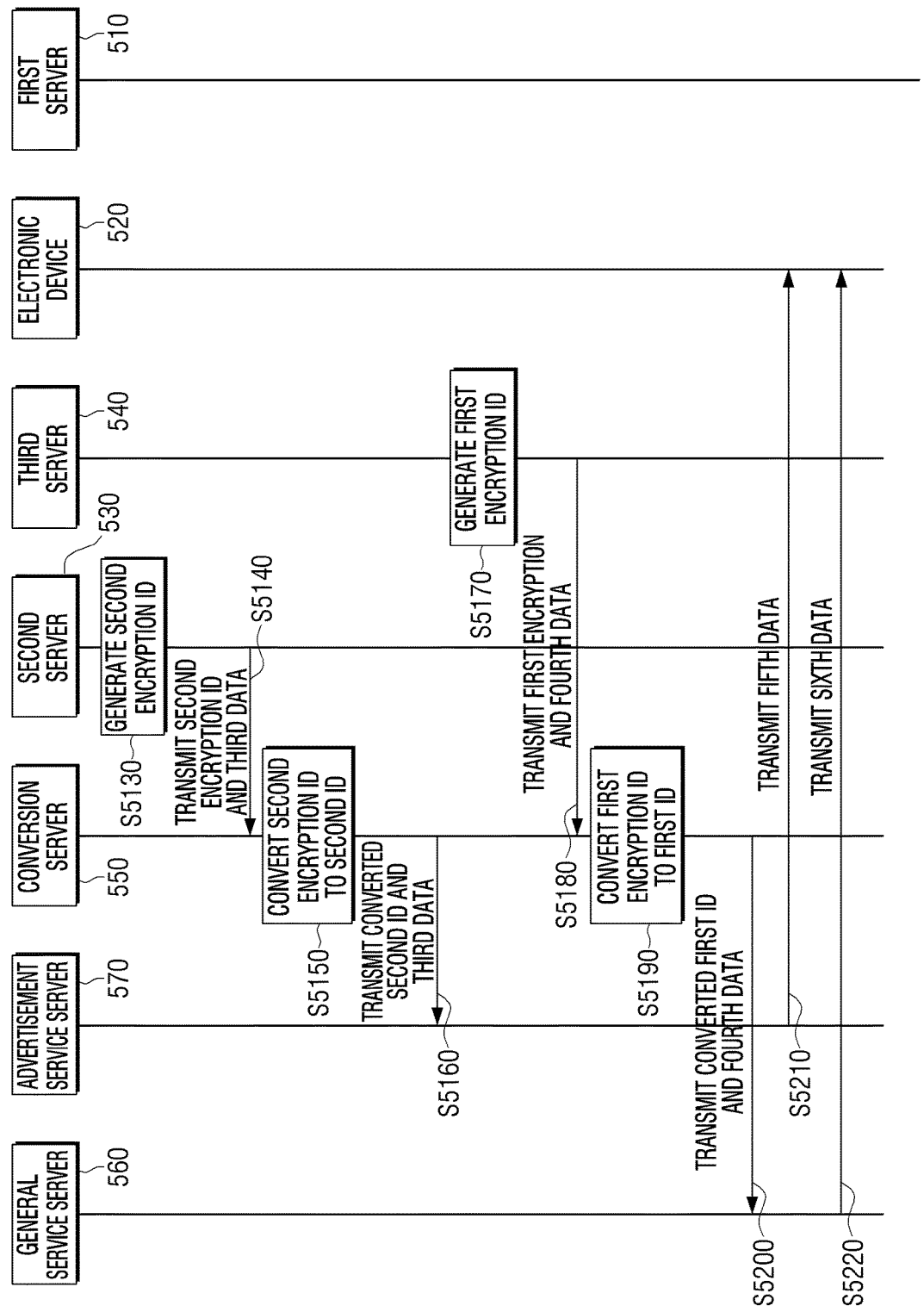

SERVER AND DATA MANAGEMENT METHOD

CROSS-REFERENCE TO RELATED APPLICATION

This application is based on and claims priority under 35 U.S.C. § 119 to Korean Patent Application No. 10-2019-0095100, filed on Aug. 5, 2019, in the Korean Intellectual Property Office, the disclosure of which is incorporated by reference herein in its entirety.

BACKGROUND

1. Field

Example embodiments of the disclosure relate to a server and a data management method of a server and, more particularly, to a server for converting an identification (ID) for managing device usage history data and an ID for managing advertisement usage history data, and a data management method of a server.

2. Description of Related Art

In the related art, in order to provide a user with a personalized advertisement based on a predicted behavior of the user, a data regarding a history of an advertisement use (hereinafter advertisement usage history data), which is data regarding a content consumed by the user, needs to be collected. In addition, to provide services associated with a device to individual electronic devices based on an electronic device usage history, data regarding the electronic device usage history needs to be collected.

Based on the electronic device usage history data and the advertisement usage history data being managed by one server, or integrally managed, problems related to private information may occur. Specifically, when information on an electronic device, information on a user of the electronic device, and usage history information on an usage of the electronic device are managed simultaneously, problems related to infringement of private information of the user may occur.

SUMMARY

Example embodiments of the disclosure address at least the above-mentioned problems and/or disadvantages and provide at least the advantages described below.

Example embodiments provide a server for dividing device usage history data and advertisement usage history data by different identifications (IDs) to manage the data by different servers, and when mapping between data is needed, encrypting identification IDs for each data for sharing, and a data management method of the server.

According to an aspect of an example embodiment, there is provided a data management method of a server, the method including receiving, from a first server, first data, in which a first identification (ID) associated with a device and a first encryption identification (ID) that encrypts an ID associated with an advertisement are mapped and, receiving, from the first server, second data, in which a second ID associated with the advertisement and a second encryption ID that encrypts an ID associated with the device are mapped; converting a second encryption ID associated with an electronic device, received from a second server, to the second ID based on the second data, and transmitting the converted second ID and third data to an advertisement service server, the third data being received from the second server and being associated with a device usage history of a user of the electronic device; and converting a first encryption ID associated with the electronic device, received from a third server, to the first ID based on the first data, and transmitting the converted first ID and fourth data to a general service server, the fourth data being received from the third server and being associated a content consumed by the user.

According to an aspect of an example embodiment, there is provided a server including: a communication interface including a circuitry; a memory including at least one instruction; and a processor connected to the communication interface and the memory, the processor being configured to control the server, wherein the processor, by executing the at least one instruction, is further configured to: receive via the communication interface, from a first server, first data, in which a first identification (ID) associated with a device and a first encryption identification (ID) that encrypts an ID associated with an advertisement are mapped and, receive via the communication interface, from the first server, second data, in which a second ID associated with the advertisement and a second encryption ID that encrypts an ID associated with the device are mapped; convert a second encryption ID associated with an electronic device, received from a second server, to the second ID based on the second data, and transmit, via the communication interface, the converted second ID and third data to an advertisement service server, the third data being received from the second server and being associated with a device usage history of a user of the electronic device; and convert a first encryption ID associated with the electronic device, received from a third server, to the first ID based on the first data, and transmit, via the communication interface, the converted first ID and fourth data to a general service server, the fourth data being received from the third server and being associated a content consumed by the user.

BRIEF DESCRIPTION OF THE DRAWINGS

The above and/or other aspects, features, and advantages of certain embodiments of the disclosure will be more apparent from the following detailed description, taken in conjunction with the accompanying drawings, in which:

FIG. 5B is a sequence diagram of a data management method of device usage history data and advertisement usage history data according to an example embodiment.

DETAILED DESCRIPTION

Example embodiments of the disclosure will be described in greater detail with reference to the accompanying drawings.

Figure 1:
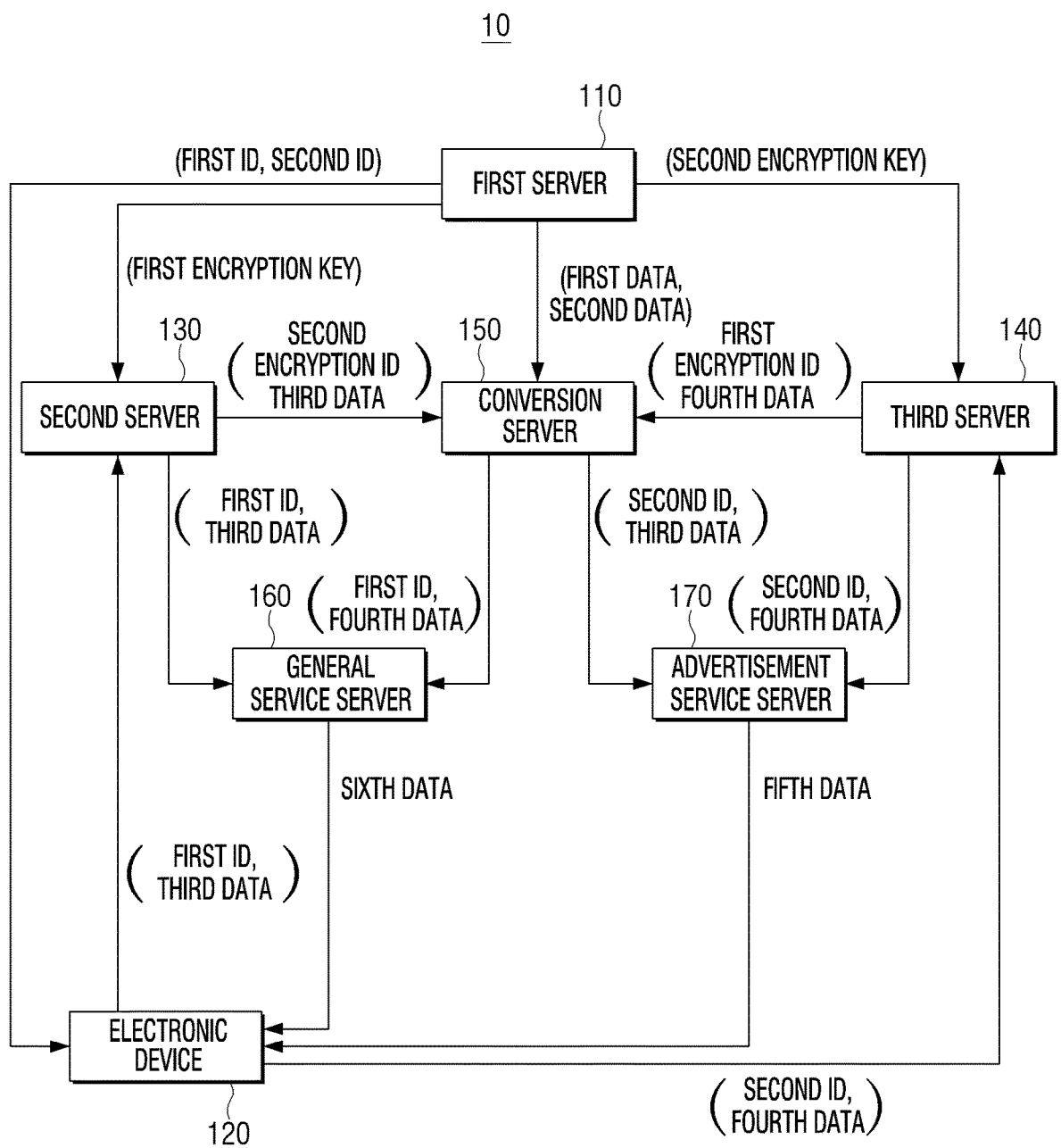
FIG. 1 is a diagram illustrating a system for managing device usage history data and advertisement usage history data according to an example embodiment.

FIG. 1 is a diagram illustrating a system 10 for managing device usage history data and advertisement usage history data according to an example embodiment.

When electronic device usage history data (hereinafter, third data) and advertisement usage history data (hereinafter, fourth data) for identifying a personalized advertisement are managed in a server or integrally managed, the electronic device and the user of the electronic device may be specified together, possibly causing a private information infringement issue.

In the system 10 according to an example embodiment, to distinguish and manage the third data and the fourth data by different IDs, a first ID for the third data and a second ID for the fourth data may be used, and the third data and the fourth data may be managed by separate servers. The third data may be managed through a second server using the first ID and the third data may be managed through a third server using the second ID.

The system 10 may include a first server 110, an electronic device 120, a second server 130, a third server 140, a data conversion server (or conversion server) 150, a general service server 160, and an advertisement service server 170.

The first server 110 may generate a first ID for the third data corresponding to the electronic device 120 and a second ID for the fourth data for identifying the personalized advertisement. According to an example embodiment, the first ID and the second ID may be assigned and generated for each of the electronic devices 120. The first server 110 may transmit the first ID and the second ID corresponding to the electronic device 120 to the electronic device 120. It has been described that the first ID is a device ID corresponding to the electronic device 120, but the first ID is not limited thereto, and may be a personal ID corresponding to the user.

The first server 110 may transmit a first encryption key corresponding to the first ID, which is transmitted to the electronic device 120, to the second server 130, and may transmit a second encryption key corresponding to the second ID, which is transmitted to the electronic device 120, to the third server 140. The first encryption key is an encryption key for encrypting the first ID, and the second encryption key is an encryption key for encrypting the second ID, which will be described below in more detail.

The electronic device 120 may receive the first ID and the second ID from the first server 110 and generate third data and fourth data. The third data is data of a usage history of the electronic device 120 and may include, for example, a frequency of use, a use time, or the like, with respect to an application used in the electronic device 120. The fourth data is data of a usage history of an advertisement, which may be used to identify the personalized advertisement. The fourth data is related to a content consumed by the user, and may include, for example, data related to a history of purchasing an item corresponding to the content or data of a history of viewing an image corresponding to the content, or the like. That is, if the user purchases an item related to the first content, and frequently views an image related to the first content, an image viewing history related to the first content and item information related to the first content purchased by the user may be included in the fourth data. The electronic device 120 may transmit the third data to the second server 130 along with the first ID, and transmit the fourth data to the third server 140 along with the second ID. Accordingly, the third data generated by the electronic device 120 may be managed by the second server 130 along with the first ID, and the fourth data generated by the electronic device 120 may be managed by the third server 140 along with the second ID.

The second server 130 may manage usage history data of the electronic device, and may receive the first ID and the third data from the electronic device 120 and receive a first ID encryption key for encrypting the first ID from the first server 110.

The second server 130 may transmit the first ID received from the electronic device 120 and the third data, which is the electronic device usage history data, to the general service server 160. The general service server 160 may process the third data to provide services associated with the electronic device 120 to the electronic device 120. The general service server 160 may provide the electronic device with a service that is identified as suitable based on the usage history of the electronic device.

The second server 130 may generate a second encryption ID to be transmitted with the third data to the advertisement service server 170. The advertisement service server 170 may process the fourth data to provide refined advertisement data (or personalized advertisement data) to the user. The advertisement service server 170 may provide the user with an advertisement for contents suitable (or personalized) for the user based on an image viewing history corresponding to the content of the user, an item purchase history corresponding to the content, or the like.

The second server 130 may generate the second encryption ID based on the received first ID and the first ID encryption key corresponding to the first ID. The second encryption ID encrypts the first ID, and when the second server 130 transmits the third data to the advertisement service server 170 along with the first ID, a problem of a private information infringement may occur. The second server 130 may transmit the second encryption ID which encrypts the first ID to the conversion server 150 along with the third data, and convert the second encryption ID into the second ID by the conversion server 150. The conversion server 150 may transmit the converted second ID to the advertisement service server 170 along with the third data.

The third server 140 may receive the second ID and the fourth data from the electronic device 120 and may receive the second encryption key from the first server 110.

The third server 140 may transmit the second ID and the fourth data which is the advertisement usage history data received from the electronic device 120 to the advertisement service server 170.

The third server 140 may generate a first encryption ID to transmit the fourth data to the general service server 160. The third server 140 may generate the first encryption ID through the received second ID and a second encryption key corresponding to the second ID. The first encryption ID encrypts the second ID, and when the third server 140 transmits the fourth data to the general service server 160 along with the second ID, a problem of a private information infringement may occur. The third server 140 may transmit the first encryption ID which encrypts the second ID to the conversion server 150 along with the fourth data, and the conversion server 150 may convert the first encryption ID to the first ID. The conversion server 150 may transmit the converted first ID to the general service server 160 along with the fourth data.

The conversion server 150 may convert the first encryption ID to the first ID and converting the second encryption ID to the second ID.

In order to convert the first encryption ID and the second encryption ID, the conversion server 150 may receive, from the first server 110, first data, in which the first ID and the first encryption ID corresponding to the first ID are mapped and second data, in which the second ID and the second encryption ID corresponding to the second ID are mapped. In the second data, the second encryption ID corresponding to the second ID and the first ID assigned to each of the electronic devices 120 is mapped, and the second data may include a mapping table for converting the second encryption ID from the conversion server 150 to a second ID corresponding to the second encryption ID using an exchange scheme. In the first data, the first encryption ID corresponding to the first ID and the second ID assigned to each of the electronic devices 120 are mapped, and the first data may include a mapping table for converting the first encryption ID from the conversion server 150 to a first ID corresponding to the first encryption ID using an exchange scheme.

When the second encryption ID and the third data are received from the second server 130, the conversion server 150 may convert the second encryption ID into a second ID corresponding to the second encryption ID based on the second data. The second data may further include time stamp information which is information on a time when the first ID and the second ID are generated. The first ID and the second ID for each electronic device 120 may be reissued by the user's selection, and change in the first ID and the second ID may be distinguished through time stamp information, which indicates a time at which the first ID and the second ID are re-issued.

The conversion server 150 may transmit the converted second ID to the advertisement service server 170 along with the third data and the third data may be utilized for the advertisement service server 170 without the private information infringement issue.

When the first encryption ID and the fourth data are received from the third server 140, the conversion server 150 may convert the first encryption ID to the first ID corresponding to the first encryption ID based on the first data. The fourth data may further include time stamp information indicating the time at which the first ID and the second ID are generated.

The fourth data may be utilized by the general service server 160 without a private information infringement issue because the converted first ID is transmitted to the general service server 160 by the conversion server 150 along with the fourth data.

In the system 10 according to an example embodiment the disclosure, the electronic device usage history data (third data) and the advertisement usage history data (fourth data) for identifying the personalized advertisement are managed by different servers, and the identification ID for the third data and the identification ID for the fourth data is converted through the conversion server 150 so that the third data and the fourth data may be transmitted to the general service server 160 and the advertisement service server 170, respectively, without a private information infringement issue. The general service server 160 may transmit sixth data to the electronic device 120 to provide services associated with the electronic device 120, and the advertisement service server 170 may transmit fifth data to the electronic device 120 for providing the refined advertisement data to the user.

According to an example embodiment of the disclosure, the electronic usage history data and the advertisement usage history data may be divided by different identification IDs and may be managed by different servers.

The electronic device usage history data may be utilized for the advertisement service server 170 through the conversion server 150, and the advertisement usage history data may be utilized for the general service server 160 for the electronic device 120.

Figure 2:
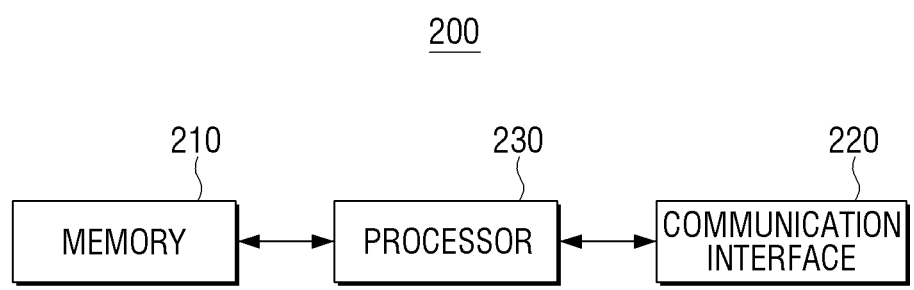
FIG. 2 is a block diagram illustrating a configuration of a conversion server for converting an identification (ID) according to an example embodiment.

FIG. 2 is a block diagram illustrating a configuration of a conversion server 200 for converting an identification ID according to an example embodiment.

The conversion server 200 may convert a first encryption ID into a first ID, converting a second encryption ID to a second ID, and transmitting the converted ID along with third data and fourth data to a general service server 160 or an advertisement service server 170 without a private information infringement issue and may include a memory 210, a communication interface 220, and a processor 230. The configuration shown in FIG. 2 is merely an example embodiment of the disclosure, and appropriate hardware/software configurations as would be apparent to one skilled in the art may be further included in the conversion server 200.

The memory 210 may store instructions or data related to at least one another element of the conversion server 200. The memory 210 may be implemented as a non-volatile memory, a volatile memory, a flash memory, a hard disk drive (HDD), a solid state drive (SSD), or the like. The memory 210 is accessed by the processor 230 and reading/writing/modifying/deleting/updating of data by the processor 230 may be performed. In an example embodiment of the disclosure, the term "memory" may include the memory 210, a read-only memory (ROM) in the processor 230, a random access memory (RAM), or a memory card (for example, a micro secure digital (SD) card, and a memory stick) mounted to the conversion server 200.

The memory 210 may store the first data and the second data received from the first server 110. The first ID and the second ID may be converted from each other using the first data in which the first ID stored in the memory 210 and the first encryption ID are mapped and the second data in which the second ID and the second encryption ID are mapped.

The memory 210 may store the second encryption ID and the third data received from the second server 130 and the first encryption ID and the fourth data received from the third server 140.

The communication interface 220 is configured to communicate with various types of external devices in accordance with various types of communication schemes. The communication interface 220 may be implemented as a Wi-Fi module. That is, the Wi-Fi module of the communication interface 220 may receive connection information (e.g., service set identifier (SSID), encryption key information, etc.) received from the server and an electronic device 400 (refer to FIG. 4) and may communicate with the server and the electronic device 400 based on the received connection information. The communication interface 220 may communicate with an external server or external device, and in particular, the communication interface 220 may receive the first data and the second data from the first server 110. The communication interface 220 may receive the second encryption ID and the third data from the second server 130 and may receive the first encryption ID and the fourth data from the third server 140.

The communication interface 220 may transmit the second ID corresponding to the generated second encryption ID to the advertisement service server 170 along with the third data. The communication interface 220 may transmit the first ID corresponding to the generated first encryption ID to the general service server 160 along with the fourth data.

The processor 230 may include one or more among a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor 230 may be implemented in a system on chip (SoC) type or a large scale integration (LSI) type which a processing algorithm is implemented therein or in a field programmable gate array (FPGA). The processor 230 may perform various functions by executing computer executable instructions stored in the memory 210. The processor 230 may be electrically connected to the memory 210 for controlling overall operations and functions of the conversion server 200.

The processor 230 according to an example embodiment the disclosure may receive, from the first server 110, the first data in which the first ID related to a device and the first encryption ID encrypting an ID related to an advertisement are mapped, and the second data in which the second ID related to an advertisement and the second encryption ID encrypting an ID related to the device are mapped. The processor 230 may receive the first data and the second data through the communication interface 220 by executing at least one command stored in the memory 210. In the first data, the first ID assigned to each of the electronic device 400 and the first encryption ID corresponding to the first ID may be mapped, and in the second data, the second ID assigned to each of the electronic device 400 and the second encryption ID corresponding to the second ID may be mapped.

Based on the third data and the second encryption ID received from the second server 130 through the communication interface 220, the processor 230 may convert the second encryption ID received from the second server 130 to the second ID corresponding to the second encryption ID based on the second data. The processor 230 may transmit the converted second ID and the third data through the communication interface 220 to the advertisement service server 170.

Based on the first encryption ID and the fourth data received from the third server 140 through the communication interface 220, the processor 230 may convert the first encryption ID received from the third server to the first ID corresponding to the first encryption ID based on the first data. The processor 230 may transmit the converted first ID and the fourth data through the communication interface 220 to the general service server 160.

Figure 3:
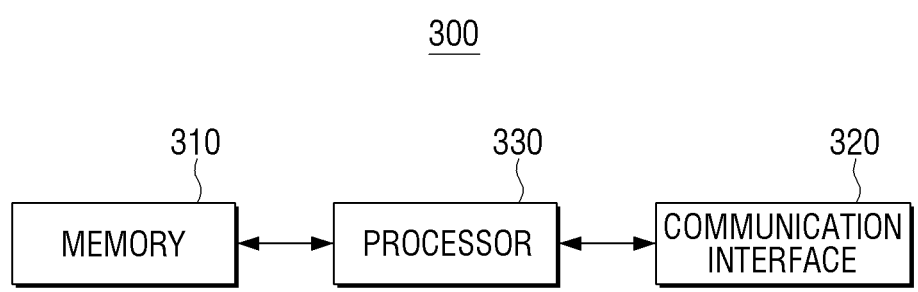
FIG. 3 is a block diagram illustrating a configuration of a first server for generating an ID according to an example embodiment.

FIG. 3 is a block diagram illustrating a configuration of a first server for generating an identification ID according to an example embodiment.

The first server 300 may generate the first ID corresponding to the electronic device 400 and the second ID for identifying the personalized advertisement, and the first server 300 according to an example embodiment may include a memory 310, a communication interface 320, and a processor 330. The configuration shown in FIG. 3 is merely an example embodiment of the disclosure, and appropriate hardware/software configurations that would be apparent to one skilled in the art may be further included in the first server 300.

The memory 310 may store instructions or data related to at least one other component of the first server 300. The memory 310 may be stored with a first ID and a second ID to be transmitted to the electronic device 400, the first ID may be an ID corresponding to the electronic device 400, and the second ID may be an ID for identifying the personalized advertisement.

The first data and the second data for transmission to the conversion server 200 may be stored in the memory 310, and a first encryption key for transmission to the second server 130 and a second encryption key for transmission to the third server 140 may be stored. The first encryption key is an encryption key corresponding to the first ID, and the second encryption key is an encryption key corresponding to the second ID.

The communication interface 320 is configured to communicate with various types of external devices in accordance with various types of communication schemes. The communication interface 320 may include a Wi-Fi wireless communication chip. The processor 330 communicates with various external devices using the communication interface 220.

The communication interface 320 may communicate with an external server or external device. The communication interface 320 may transmit, to the electronic device 400, a first ID corresponding to the electronic device 400 and a second ID for identifying the personalized advertisement. The communication interface 320 may transmit the first encryption key to the second server 130 and transmit the second encryption key to the third server 140. The communication interface 320 may also transmit the first data and the second data to the conversion server 200.

The processor 330 may perform various functions by executing computer executable instructions stored in the memory 310. The processor 330 may be electrically coupled to the memory 310 to control the overall operations and functions of the first server 300.

The processor 330 of the first server 300 according to an example embodiment of the disclosure may generate a first ID and a second ID by executing at least one instruction stored in the memory 310, and transmit, to the electronic device 400, a first ID and a second ID corresponding to the electronic device 400 via the communication interface 320.

The processor 330 may transmit a first encryption key corresponding to the first ID transmitted to the electronic device 400 to the second server 130, and transmit a second encryption key corresponding to the second ID transmitted to the electronic device 400 to the third server 140 through the communication interface 320.

The processor 330 may generate the first data in which the first ID and the first encryption ID corresponding to the first ID are mapped and the second data in which the second ID and the second encryption ID corresponding to the second ID are mapped, and may transmit the generated data to the conversion server 200 through the communication interface 320.

Figure 4:
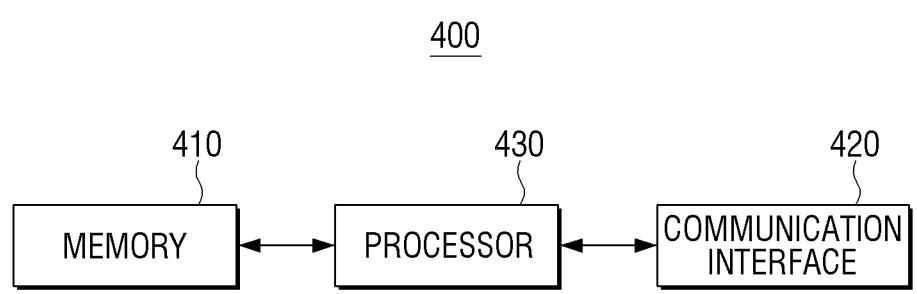
FIG. 4 is a block diagram illustrating a configuration of an electronic device according to an example embodiment.

FIG. 4 is a block diagram illustrating a configuration of an electronic device according to an example embodiment.

The electronic device 400 may include a memory 410, a communication interface 420, and a processor 430. The configuration shown in FIG. 4 is merely an example embodiment of the disclosure, and appropriate hardware/software configurations that would be apparent to one skilled in the art may be further included in the electronic device 400.

The memory 410 may store instructions or data related to at least one other component of the electronic device 400. The memory 410 of the electronic device 400 stores the first ID and the second ID received from the first server 300, and the third data and the fourth data generated by the electronic device 400 may be stored.

The communication interface 420 is configured to communicate with various types of external devices in accordance with various types of communication schemes. The communication interface 420 may receive the first ID and the second ID from the first server 300, transmit the first ID and the third data to the second server 130, and transmit the second ID and the fourth data to the third server 140.

The communication interface 420 may receive sixth data for providing services associated with the electronic device 400 from the general service server 160, and may receive fifth data for providing refined advertisement data from the advertisement service server 170.

The processor 430 may perform various functions by executing computer executable instructions stored in the memory 410. The processor 430 may be electrically connected to the memory 410 to control the overall operations and functions of the electronic device 400.

The processor 430 of the electronic device 400 may execute at least one instruction stored in the memory 410 to generate the third data, which is usage history data of the electronic device 400, and fourth data, which is usage history data of an advertisement.

The processor 430 may receive the first ID and the second ID corresponding to the electronic device 400 from the first server through the communication interface 420, and transmit the first ID and the third data to the second server 130 through the communication interface 420. The processor 430 may also transmit the second ID and the third data to the third server 140.

Figure 5A:
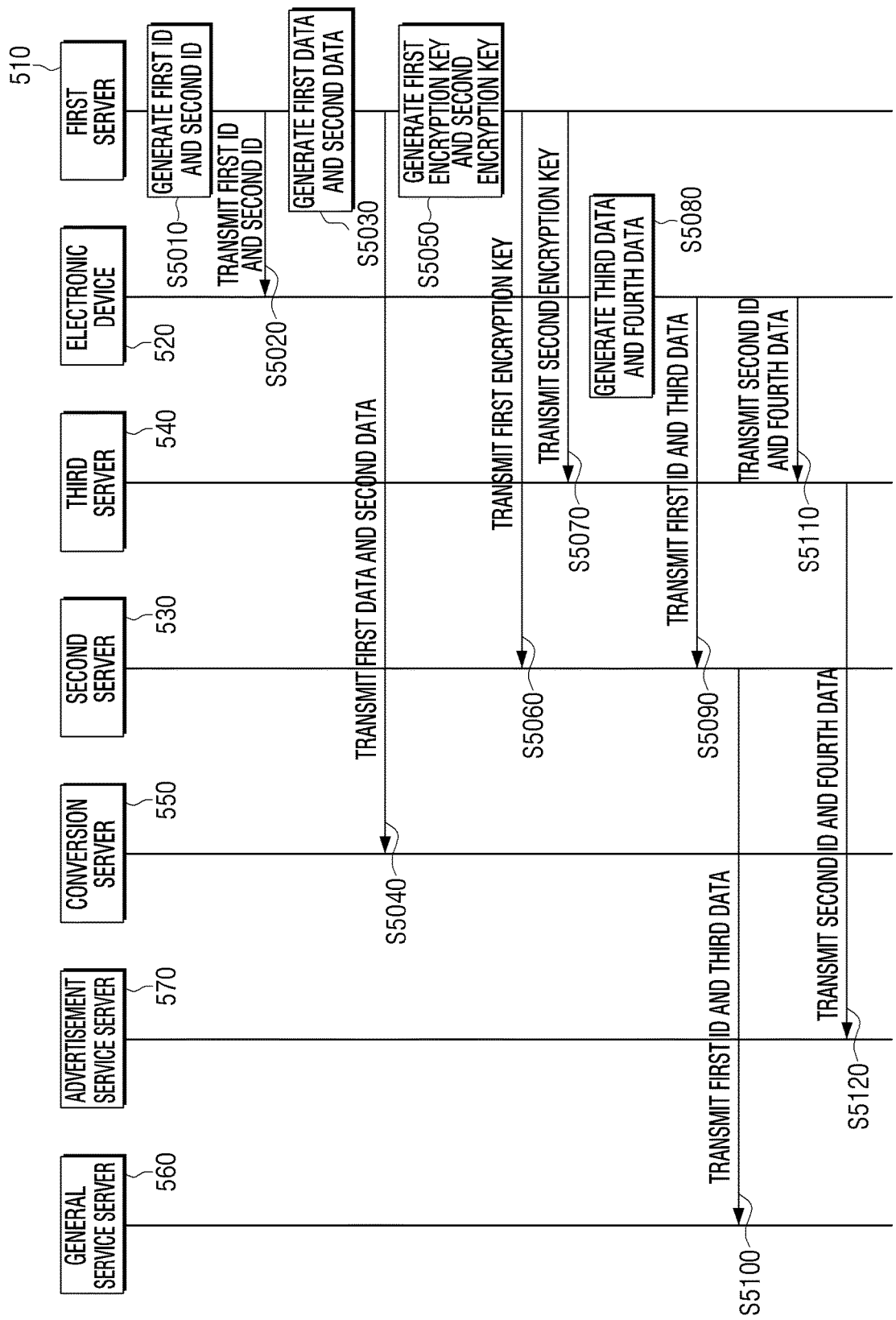
FIG. 5A is a sequence diagram of a data management method of device usage history data and advertisement usage history data according to an example embodiment.

FIGS. 5A and 5B are sequence diagrams of a data management method of device usage history data and advertisement usage history data according to an example embodiment.

Referring to FIG. 5A, a first server 510 may generate a first ID for managing device usage history data and a second ID for managing usage history data for the advertisement in operation S5010. The first server 510 may generate a first ID and a second ID corresponding to each electronic device, and the first server 510 may transmit, to an electronic device 520, a first ID and a second ID corresponding to the electronic device 520 in operation S5020. Although only one electronic device 520 is illustrated in FIGS. 5A and 5B, a first ID and a second ID corresponding to each of a plurality of electronic devices may be generated, and a first ID and a second ID may be transmitted to each of the plurality of electronic devices 520.

The first server 510 may generate the first data and the second data in operation S5030. The first data may include a table in which the first ID and the first encryption ID in which the second ID assigned to an electronic device corresponding to the first ID are encrypted are mapped, and the second data may include a table in which the second ID and the second encryption ID encrypting the first ID assigned to the electronic device corresponding to the second ID are mapped. The first server 510 may transmit the generated first data and the second data to the conversion server 550 in operation S5040, and the conversion server 550 may convert the first encryption ID into the first ID based on the received first data and the second data, and convert the second encryption ID into the second ID.

The first server 510 may generate a first encryption key and a second encryption key in operation S5050, the first encryption key is an encryption key for encrypting the first ID, and the second encryption key is an encryption key for encrypting the second ID. Based on the first encryption key and the second encryption key being generated, the first server 510 may transmit the first encryption key to a second server 530 in operation S5060, and transmit the second encryption key to a third server 540 in operation S5070. Although FIG. 5A illustrates that the first server 510 generates the first data and the second data in operation S5030, and the first and second encryption keys are generated in operation S5050, but the embodiment is not limited thereto, and the first and second data may be generated after the first encryption key and the second encryption key are generated.

The electronic device 520 may generate third data that is device usage history data and fourth data that is usage history data of the advertisement (or advertisement usage history data) in operation S5080. The third data may refer to data associated with the frequency of use for each application of the electronic device 520, the time at which each application is used, and the like. The fourth data may include data for identifying the personalized advertisement, data related to the content consumed by the user and may include, for example, data related to the history of the user purchasing an item corresponding to the content, and data regarding the history of viewing the image corresponding to the content.

The electronic device 520 may transmit the third data to the second server 530 along with the first ID received from the first server 510 in operation S5090. The third data received from the electronic device 520 may be managed with the first ID corresponding to the electronic device 520 by the second server 530. The second server 530 may transmit the third data and the first ID received from the electronic device 520 to a general service server 560 in operation S5100. Since the third data is the data associated with the electronic device 520 and the first ID is the ID associated with the electronic device 520, the first ID may be transmitted along with the third data to the general service server 560 for providing services associated with the electronic device 120 without ID conversion.

The electronic device 520 may transmit the generated fourth data to the third server 540 along with the second ID received from the first server 510 in operation S5110. The fourth data received from the electronic device 520 may be managed with the second ID at the third server 540. The third server 540 may transmit the fourth data and the second ID received from the electronic device 520 to an advertisement service server 570 in operation S5120. Since the fourth data is data for the advertisement and the second ID is the ID associated with the advertisement, the second ID may be transmitted along with the fourth data to the advertisement service server 570 for providing the user with refined advertisement data without ID conversion. The following is described below with reference to FIG. 5B.

Referring to FIG. 5B, the second server 530 may convert the first ID into the second encryption ID based on the first encryption key received from the first server 510 in operation S5130. That is, the second server 530 may convert the first ID to the second encryption ID using the first encryption key, which is used for transmitting the third data, which is data for the electronic device 520, to the advertisement service server 570. The second server 530 may transmit the converted second encryption ID to a conversion server 550 along with the third data at step S5140. The conversion server 550 may convert the received second encryption ID into the second ID in operation S5150, and transmit the converted second ID to the advertisement service server 570 along with the third data in operation S5160.

The third server 540 may generate the first encryption ID by converting the second ID into the first encryption ID based on the second encryption key received from the first server 510 in operation S5170. The third server 540 may convert the second ID into the first encryption ID using the second encryption key to transmit the fourth data, which is data related to the advertisement, to the general service server 560. The third server 540 may transmit the converted first encryption ID to the conversion server 550 along with the fourth data in operation S5180. The conversion server 550 may convert the received first encryption ID into the first ID in operation S5190, and transmit the converted first ID along with the fourth data to the general service server 560 in operation S5200. Although FIG. 5B illustrates that the first encryption ID is generated in operation S5170 after the second encryption ID is generated in operation S5130, a second encryption ID may be generated after the first encryption ID is generated, or may be generated simultaneously.

The advertisement service server 570 may transmit fifth data to the electronic device 520 for providing the refined advertisement data to the user in operation S5210, and the general service server 560 may transmit, to the electronic device 520, the sixth data for providing the service related to the electronic device 520 in operation S5220.

Figure 6:
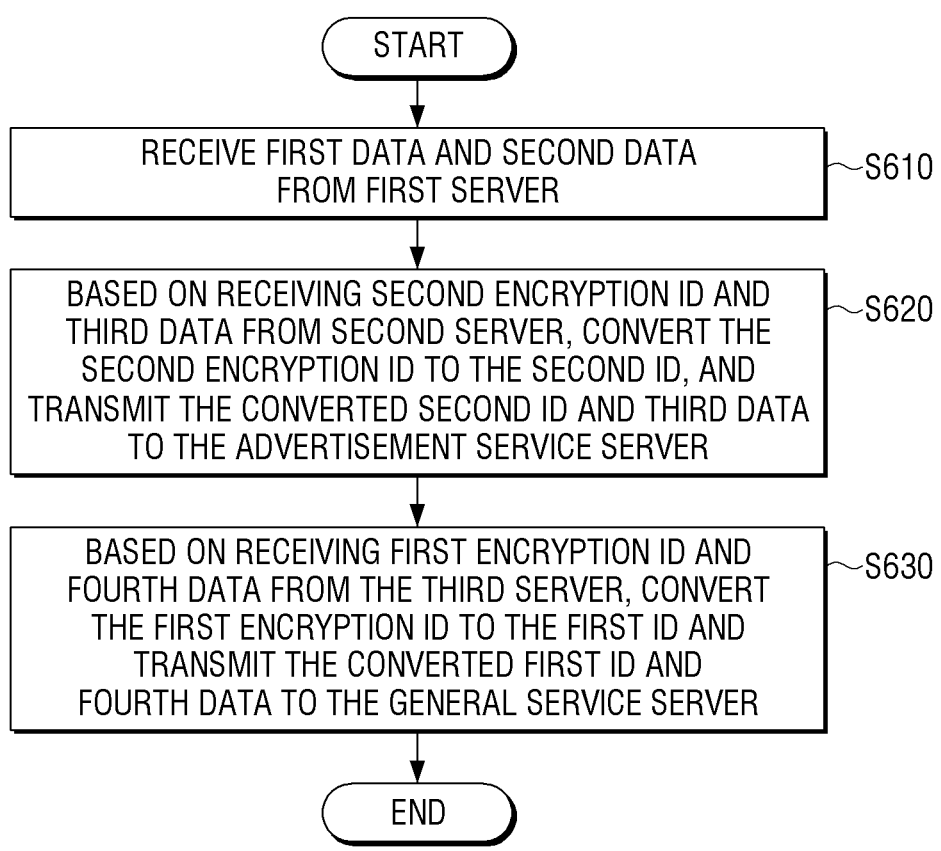
FIG. 6 is a flowchart of a data management method of a conversion server according to an example embodiment.

FIG. 6 is a flowchart of a data management method of a conversion server according to an example embodiment.

The conversion server 200 may receive the first data and the second data from the first server 300 in operation S610. The first data may include a mapping table that enables the conversion server 200 to convert the first encryption ID to a first ID corresponding to the first encryption ID by an exchange scheme. The second data may include a mapping table that enables the conversion server 200 to convert the second encryption ID to a second ID corresponding to the second encryption ID by an exchange scheme.

When the conversion server 200 receives the second encryption ID and the third data from the first server 300, the conversion server 200 may convert the second encryption ID into the second ID, and transmit the converted second ID and the third data to the advertisement service server 170 in operation S620. The first ID for the third data may be converted into a second ID corresponding to the first ID through the conversion server 150, so that the third data may be transmitted to the advertisement service server 170 without a private information infringement issue.

When the conversion server 200 receives the first encryption ID and the fourth data from the third server 140, the conversion server 200 may convert the first encryption ID into the first ID and transmit the converted first ID and the fourth data to the general service server 160 in operation S630. The second ID for the fourth data may be converted into the first ID corresponding to the second ID through the conversion server 150 so that the third data may be transmitted to the general service server 160 without a private information infringement issue.

The various example embodiments described above may be implemented in software, hardware, or the combination of software and hardware. By hardware implementation, the example embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, example embodiments described herein may be implemented by the processor itself. According to a software implementation, example embodiments of the disclosure, such as the procedures and functions described herein may be implemented with separate software modules. Each of the above-described software modules may perform one or more of the functions and operations described herein.

The method according to the various example embodiments may be stored in a non-transitory readable medium. The non-transitory readable medium may be loaded in various devices and used.

The non-transitory computer readable medium may refer, for example, to a medium that stores data semi-permanently, and is readable by an apparatus. For example, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like.

According to example embodiments of the disclosure, a method disclosed herein may be provided in a computer program product. A computer program product may be traded between a seller and a purchaser as a commodity. A computer program product may be distributed in the form of a machine-readable storage medium (e.g., a compact disc (CD)-ROM) or distributed online through an application store (e.g., PlayStore™). In the case of on-line distribution, at least a portion of the computer program product may be stored temporarily or at least temporarily in a storage medium, such as a manufacturer's server, a server in an application store, a memory in a relay server, and the like.

While the disclosure has been shown and described with reference to various example embodiments, it will be understood by those skilled in the art that various changes in form and details may be made therein without departing from the spirit and scope of the disclosure as defined by the appended claims and their equivalents.

What is claimed is:

1. A data management method performed by a server, the method comprising:
   receiving, by the server from a first server, first data, in which a first identification (ID) associated with a device and a first encryption identification (ID) that encrypts an ID associated with an advertisement are mapped and, receiving, from the first server, second data, in which a second ID associated with the advertisement and a second encryption ID that encrypts an ID associated with the device are mapped;
   converting, by the server, a second encryption ID associated with an electronic device, received from a second server, to the second ID based on the second data, and transmitting the converted second ID and third data to an advertisement service server, the third data being received from the second server and being associated with a device usage history of a user of the electronic device; and
   converting, by the server, a first encryption ID associated with the electronic device, received from a third server, to the first ID based on the first data, and transmitting the converted first ID and fourth data to a general service server, the fourth data being received from the third server and being associated a content consumed by the user.

2. The method of claim 1, wherein:
   the converted first ID corresponds to an ID assigned to the electronic device and transmitted by the first server to the electronic device, and
   the converted second ID is an ID for identifying a personalized advertisement and transmitted by the first server to the electronic device.

3. The method of claim 1, wherein:
the first ID and the second ID are generated by the first server,
the first ID included in the first data is mapped with the first encryption ID, the first encryption ID encrypting the second ID corresponding to the first ID, and
the second ID included in the second data is mapped with the second encryption ID, the second encryption ID encrypting the first ID corresponding to the second ID.

4. The method of claim 1, wherein:
the second encryption ID received from the second server is generated by the second server based on a first encryption key, the first encryption key corresponding to the first ID and being transmitted by the first server to the second server, and the first ID transmitted by the electronic device to the second server, and
the third data is data transmitted by the electronic device to the second server.

5. The method of claim 1, wherein:
the first encryption ID received from the third server is generated based on a second encryption key, the second encryption key corresponding to the second ID and being transmitted by the first server to the third server, and the second ID transmitted by the electronic device to the third server, and
the fourth data is data transmitted by the electronic device to the third server.

6. The method of claim 1, wherein the fourth data comprises information of a purchase by the user of an item corresponding to the content and information of viewing by the user an image corresponding to the content.

7. The method of claim 1, wherein the first data and the second data further comprise time stamp information associated with a time at which at least one of the first ID or the second ID is generated.

8. The method of claim 1, wherein:
the first ID is transmitted from the second server to the general service server along with the third data, and
the second ID is transmitted from the third server to the advertisement service server along with the fourth data.

9. A server comprising:
a communication interface comprising a circuitry;
a memory comprising at least one instruction; and
a processor connected to the communication interface and the memory, the processor being configured to control the server,
wherein the processor, by executing the at least one instruction, is further configured to:
control the server to receive via the communication interface, from a first server, first data, in which a first identification (ID) associated with a device and a first encryption identification (ID) that encrypts an ID associated with an advertisement are mapped and, receive via the communication interface, from the first server, second data, in which a second ID associated with the advertisement and a second encryption ID that encrypts an ID associated with the device are mapped;
control the server to convert a second encryption ID associated with an electronic device, received from a second server, to the second ID based on the second data, and transmit, via the communication interface, the converted second ID and third data to an advertisement service server, the third data being received from the second server and being associated with a device usage history of a user of the electronic device; and
control the server to convert a first encryption ID associated with the electronic device, received from a third server, to the first ID based on the first data, and transmit, via the communication interface, the converted first ID and fourth data to a general service server, the fourth data being received from the third server and being associated a content consumed by the user.

10. The server of claim 9, wherein:
the first ID is an ID assigned to the electronic device and transmitted by the first server to the electronic device, and
the second ID is an ID for identifying a personalized advertisement and transmitted by the first server to the electronic device.

11. The server of claim 9, wherein:
the first ID and the second ID are generated by the first server,
the first ID included in the first data is mapped with the first encryption ID, the first encryption ID encrypting the second ID corresponding to the first ID, and
the second ID included in the second data is mapped with the second encryption ID, the second encryption ID encrypting the first ID corresponding to the second ID.

12. The server of claim 9, wherein:
the second encryption ID received from the second server is generated at the second server based on a first encryption key, the first encryption key corresponding to the first ID and being transmitted by the first server to the second server, and a first ID transmitted by the electronic device to the second server, and
the third data is data transmitted by the electronic device to the second server.

13. The server of claim 9, wherein:
the first ID received from the third server is generated at the third server based on a second encryption key, the second encryption key corresponding to the second ID and being transmitted by the first server to the third server, and the second ID transmitted by the electronic device to the third server, and
the fourth data is data transmitted by the electronic device to the third server.

14. The server of claim 9, wherein the fourth data comprises information of a purchase by the user of an item corresponding to the content and information of viewing by the user an image corresponding to the content.

15. The server of claim 9, wherein the first data and the second data further comprise time stamp information for a time at which at least one of the first ID or the second ID is generated.

16. The server of claim 9, wherein:
the first ID is transmitted from the second server to the general service server along with the third data, and
the second ID is transmitted from the third server to the advertisement service server along with the fourth data.

* * * * *